United States Patent Office

3,083,171
Patented Mar. 26, 1963

3,083,171
THERMOSETTING ACRYLIC EMULSION CO-
POLYMERS CONTAINING THE NORBORNENE
NUCLEUS, COATING COMPOSITIONS MADE
THEREFROM, AND ARTICLES COATED
THEREWITH
Eli J. Aronoff, Glen Oaks, Guy J. Del Franco, Brooklyn,
and Hugh J. Rooney, Yonkers, N.Y., assignors to Inter-
chemical Corporation, New York, N.Y., a corporation
of Ohio
No Drawing. Filed Feb. 13, 1961, Ser. No. 88,660
7 Claims. (Cl. 260—29.4)

This invention relates to thermosetting emulsions for industrial finishes comprising copolymers of acrylic compounds with 2-hydroxymethyl-5-norbornene. More particularly it relates to thermosetting emulsions comprising tetrapolymers formed by copolymerizing a major part of an alkyl acrylate with minor parts of 2-hydroxymethyl-5-norbornene, glycidyl methacrylate, and methacrylic acid, to thermosetting industrial finishes comprising a heat reactive blend of these emulsions with water-soluble melamine foramaldehyde resins, and to articles coated therewith.

The novel latices of this invention are cross-linkable without additives. When blended with aminoplasts they form valuable heat-curable finishes for industrial applications. The latices, with or without pigments, form porcelainlike baked coatings on metals that are very hard, strongly adherent to the substrates, tack free, blush resistant, glossy, and they show low extractability with hot organic solvents. The coatings on tinplate made from blends with aminoplasts have all the advantages recited above and in addition they are more flexible and more resistant to detergents than when the aminoplasts are absent. These compositions have unusually good pigment wetting power, thus facilitating the dispersion of titanium dioxide, carbon black, phthalocyanines, and other pigments. Although the latices are particularly valuable for appliance finishes, they are also useful for adhesives, textiles, and industrial finishes in general.

The latices of this invention may be prepared in about 2 hours by heating to reflux temperatures a major amount of alkyl esters of acrylic acid or methacrylic acid and minor amounts of glycidyl methacrylate, methacrylic, acrylic, itaconic, crotonic, or isocrotonic acids, and 2-hydroxymethyl-5-norbornene in water in the presence of an emulsifier and a suitable polymerization initiator of the free radical type. This conversion of monomers is practically complete. There are thus formed stable thermosetting emulsion systems which when neutralized are compatible with water soluble melamine resins. Such blends applied as pigmented or unpigmented coatings on metallic substrates and cured have excellent properties for household appliance finishes and the like. The latices are also useful in the formulations of water-based adhesives, textile coatings, and general industrial finishes.

Examples 1-8 illustrate the practice of this invention. Examples 9-13 show the effect of omitting various constituents. Cyclol is a trade name for 2-hydroxy-methyl-5-norbornene. Duponol C is sodium lauryl sulfate.

All the preparations described were carried out under a blanket of nitrogen. The reaction time in each example did not exceed 2¼ hours.

*Example 1*

300 g. water, 42.5 g. ethyl acrylate, 10 g. Cyclol, 10 g. glycidyl methacrylate, 2.5 g. methacrylic acid, 4.0 g. Duponol C, and 0.2 g. ammonium persulfate were heated to reflux temperature (84° C.). A mixture of 127.5 g. ethyl acrylate and 7.5 g. of methacrylic acid was then added dropwise, the temperature being maintained at the reflux level. The rate of addition was such that the temperature of reflux was below 90° C. The addition was made over a period of 45 minutes and then the temperature was raised to 97° C. The batch was cooled and filtered. The latex had a solids content of 38.5%. Conversion was 96%.

*Example 2*

1200 g. water, 140 g. butyl acrylate, 40 g. Cyclol, 120 g. glycidyl methacrylate, 20 g. methacrylic acid, 16 g. Duponol C, and 0.8 g. of ammonium persulfate were heated to reflux temperature (92° C.) and a mixture of 420 g. butyl acrylate and 60 g. methacrylic acid was added dropwise, the temperature being maintained at the reflux level. The rate of addition was such that the reflux temperature did not exceed 95° C. The time required for the addition was 1 hour. The batch was then heated about 1 hour more, the final temperature being 98° C., cooled, and filtered. The solids content was 38.7% and the conversion of monomers 97%.

*Example 3*

The preceding example was repeated using lauryl acrylate instead of butyl acrylate, the reflux temperature not exceeding 100° C. Solids content was 40%. Conversion was 100%.

*Example 4*

The preceding example was repeated using ethyl hexyl acrylate instead of lauryl acrylate. The reflux temperature was not allowed to exceed 97° C. The solids content was 40%. Conversion was 100%.

*Example 5*

The preceding example was repeated using methyl methacrylate instead of ethyl hexyl acrylate, the reflux temperature remaining at 93° C. The temperature at the end of the reaction was 99.5°. Solids content was 40% and conversion was 100%.

*Example 6*

600 g. water, 20 g. Cyclol, 35 g. ethyl acrylate, 35 g. ethyl hexyl acrylate, 60 g. glycidyl methacrylate, 10 g. methacrylic acid, 8 g. Duponol, 0.4 g. ammonium persulfate were heated to reflux (88° C.). A mixture of 105 g. ethyl acrylate, 105 g. ethyl hexyl acrylate, and 30 g. methacrylic acid was added dropwise, the reflux temperature not being allowed to exceed 92° C. The batch was then heated up to 98.5° C., cooled, and filtered. Solids content was 38.4% and the monomer conversion 96%.

*Example 7*

1200 g. water, 140 g. ethyl acrylate, 40 g. Cyclol, 120 g. glycidyl methacrylate, 20 g. methacrylic acid, 16 g. Duponol, and 0.8 g. of ammonium persulfate were heated to reflux (86° C.). A mixture of 420 g. ethyl acrylate and 60 g. of methacrylic acid was added dropwise (1 hour), the reflux temperature not exceeding 90° C. After the addition the temperature was allowed to reach 99° C. (1 hour) and then the batch was cooled and filtered. Solids content was 39.9% compared with a theoretical value of 40%. Conversion was 99.8%.

*Example 8*

600 g. water, 87.5 g. ethyl acrylate, 20 g. Cyclol, 20 g. glycidyl methacrylate, 10 g. itaconic acid, 6 g. Duponol C, and 0.1 g. ammonium persulfate were heated to reflux temperature (83° C.). 262.5 g. ethyl acrylate were added dropwise, the temperature being maintained at the reflux level. The addition was made and the reflux temperature continued to rise up to 98° C. The batch was cooled and filtered. Total reaction time was 1½ hours. Solids content was 38.1, showing a conversion of 95.5%.

*Example 9*

300 g. water, 45 g. ethyl acrylate, 2.5 g. methacrylic acid, 20 g. Cyclol, 2.5 g. Duponol C, and 0.1 g. ammonium persulfate were heated to reflux temperature (85° C.). A mixture of 135 g. ethyl acrylate and 7.5 g. methacrylic acid was added dropwise at such a rate that the reflux temperature did not exceed 90° C. After the addition was complete the batch was heated to 97° C. and then cooled and filtered. The solids content was 39.8%. Analysis showed 90% conversion of Cyclol. This latex coagulated when neutralized with ammonia. A cured film blushed when treated with hot water.

*Example 10*

Example 2 was repeated using the ratios 80 ethyl acrylate, 10 Cyclol, and 10 methacrylic acid instead of the ratios 90:5:5. This coagulated when neutralized with ammonia. Hot water treatment of a cured film caused some blushing.

*Example 11*

A latex was prepared by the method of the previous example, the proportions of monomers being 85 ethyl acrylate, 10 Cyclol, and 5 methacrylic acid. Appreciable coagulation occurred.

*Example 12*

A latex was prepared by the method of the preceding example using 85 ethyl acrylate, 5 Cyclol, and 10 methacrylic acid. The latex was very unstable and it could not be easily blended with melamine resins.

*Example 13*

300 g. water, 45 g. ethyl acrylate, 10 g. Cyclol, 10 g. glycidyl methacrylate, 4.0 g. Duponol, 0.2 g. ammonium persulfate were heated to reflux temperature (83° C.). 135 g. of ethyl acrylate were added dropwise at such a rate that the reflux temperature did not exceed 90° C. The batch was then heated to 97° C., cooled, and filtered. The latex had a solids content of 38.2%. Conversion was 95.5%. When blended with melamine resin and a cured film of the blend was treated with hot water, blushing occurred.

The absence of any one of the comonomers leads to a loss of at least one of the desirable properties.

Latices made without Cyclol, for example one made with 85% ethyl acrylate, 10% glycidyl methacrylate, and 5% methacrylic acid or with 90% ethyl acrylate, 5% glycidyl methacrylate, and 5% methacrylic acid, were inferior to the latices of this invention. They were too soft, had poorer water resistance, and decreased adhesion for instance. The amount of Cyclol present is preferably in the range of 5–20%. Less than 5% weakens the crosslinking action; greater quantities than 20% yield films that are too brittle.

Methacrylic, acrylic, crotonic, isocrotonic, and itaconic acids are best kept in the range 2½–8%, since the latices become undesirably unstable when more is used and a lesser amount produces too soft a film. As an illustration, it was found that the latex of Example 11 was very unstable and could not be readily blended with the water-soluble melamine or urea formaldehyde resins.

The amount of glycidyl methacrylate may be varied somewhat without harmful effect, but it is preferably 1 to 2 times that of the methacrylic or other similar acid used.

Ethyl acrylate may be replaced by many other alkyl acrylates or methacrylates, such as methyl, propyl, butyl, amyl, hexyl, ethyl hexyl, lauryl, etc. either singly or mixed. The quantity of these components in the latices is not critical except insofar as the percentage ranges of the other ingredients have a limiting effect.

Conventional emulsifiers may be used.

It was found that ammonium persulfate was a satisfactory polymerization initiator for the temperature ranges encountered in the preceding examples, but other free radical initiators with suitable decomposition ranges may be selected from the conventional types. 0.3 to 1.0% of ammonium persulfate gave good results in the illustrative examples described here, but the quantity is conventional in the art.

Outstanding vehicles for appliance finishes are obtained by blending about 3 to 4 parts by weight of the neutralized latices of this invention with 1 part of a suitable water-soluble aminoplast. Blending is preferably preceded by neutralization of the latex with ammonia, morpholine, or other alkali volatile at ordinary processing temperatures. The latices readily tolerate pigments. With or without pigments the unblended latices form hard adherent, tack-free, glossy, flexible, and blush-resistant coatings on metal such as tinplate and blackplate. The blends with aminoplasts have all these desirable properties and in addition have good detergent resistance and are extremely hard. The pigmented finishes resemble porcelain appearance and their properties compare favorably with those of the other appliance finishes now in use. The test values found for the hardness and adhesion to metal of finishes made from these latices are about double those found for finishes based on similar tetrapolymers made by solution or mass polymerization. The adhesion is so strong that the baked coatings also adhere well to glass. The hardness was graphically illustrated by striking coated metal panels against the corner of a bench top. The metal was dented but the coatings were unmarred. The latices also have the advantage that they may be applied over water soluble or latex primers as well as over other primers and they may be blended with latices or water-soluble resins. There is at present only one commercially available latex that can be used in baked pigmented top coatings having satisfactory properties for appliance finishes. The general advantages of latices in coating operations are well known, for instance the avoidance of organic solvents. Application to substrates may be made by spraying or by any other suitable conventional method.

As an illustration of the preparation of a finished surface, the latex of Example 1 was neutralized with 10% ammonium hydroxide solution and then 3 parts were blended with 1 part of Aerotex M–3 (a water-soluble melamine-formaldehyde resin). A valuable thermosetting topcoat for industrial finishes was made by mixing 60 parts of this blend with 40 parts of rutile titanium dioxide. Panels coated therewith and baked 30 minutes at 350° F. showed excellent adhesion, a pencil hardness of F, good flexibility on a ⅝₁₆-inch conical mandrel, and good gloss.

What is claimed is:

1. A latex comprised of a dispersion in water of a thermosetting copolymer of a major amount of an alkyl acrylate and about 5–15% by weight of glycidyl methacrylate, about 5–20% by weight of 2-hydroxymethyl-5-norbornene and about 2½–8% by weight of an acid selected from the group consisting of methacrylic acid and itaconic acid, the copolymer representing a conversion of more than 95% by weight of the monomers used to make said latex.

2. A heat-curable surface-coating composition comprising a blend of (A) a minor amount of a water-soluble aminoplast of the class consisting of triazine-formaldehyde resins, ureaformaldehyde resins, and blends of these two resins with (B) a major amount of the latex described in claim 1, the latex, prior to blending having been neutralized with an alkali volatile at ordinary processing temperatures.

3. A heat-curable surface-coating composition consisting of a pigment dispersed in a vehicle consisting of the coating composition described in claim 2.

4. A heat-curable surface-coating composition comprising a blend of about 1 part by weight of (A) a water-soluble resin selected from the group consisting of triazine-formaldehyde resins, urea-formaldehyde resins, and blends of these two resins and (B) about 3 to 4 parts by weight of a latex neutralized with ammonia, the latex comprising a dispersion in water of about 30 to 40% by weight of a copolymer of about 60–85% by weight of an alkyl acrylate, the alkyl group having 1–14 carbon atoms, about 5–20% by weight of 2-hydroxymethyl-5-norbornene, about 5–15% by weight of glycidyl methacrylate, and about 2½–8% by weight of an acid selected from the group consisting of methacrylic acid and itaconic acid, the copolymer representing a conversion of more than 95% by weight of the monomers used to make said latex.

5. A heat-curable surface-coating composition consisting of a pigment dispersed in a vehicle consisting of the coating composition described in claim 4.

6. A coated article comprising a substrate which has been coated with the composition described in claim 3 and thereafter subjected to a temperature of about 300–400° F. for about 15–45 minutes.

7. A coated article comprising a substrate which has been coated with the composition described in claim 5 and thereafter subjected to a temperature of about 300–400° F. for about 15–45 minutes.

References Cited in the file of this patent

UNITED STATES PATENTS

| | | |
|---|---|---|
| 2,787,561 | Sanders | Apr. 2, 1957 |
| 2,985,611 | Gaylord et al. | May 23, 1961 |